Figure 1:
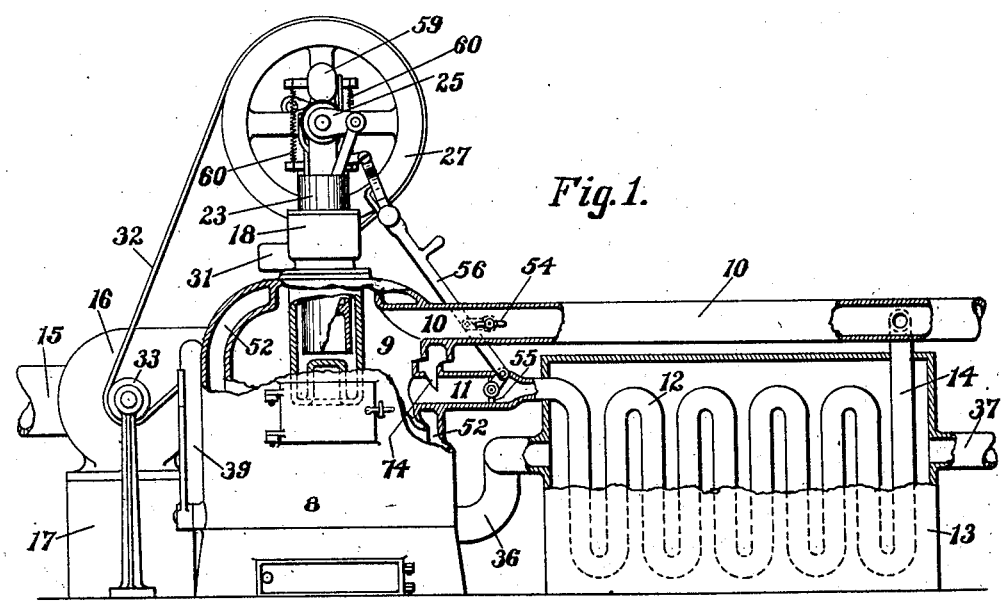

N. B. WALES.
HEATING APPARATUS.
APPLICATION FILED APR. 10, 1911.

1,077,379.

Patented Nov. 4, 1913.
2 SHEETS—SHEET 1.

WITNESSES:
David Lichtenstein
Enid S. Wales

INVENTOR.
Nathaniel B. Wales

N. B. WALES.
HEATING APPARATUS.
APPLICATION FILED APR. 10, 1911.

1,077,379.

Patented Nov. 4, 1913.
2 SHEETS—SHEET 2.

WITNESSES:   INVENTOR.

UNITED STATES PATENT OFFICE.

NATHANIEL B. WALES, OF BOSTON, MASSACHUSETTS.

HEATING APPARATUS.

1,077,379.    Specification of Letters Patent.    Patented Nov. 4, 1913.

Application filed April 10, 1911.   Serial No. 620,125.

*To all whom it may concern:*

Be it known that I, NATHANIEL B. WALES, a citizen of the United States, residing at Boston, in the county of Suffolk, State of Massachusetts, have invented a new and useful Improvement in Heating Apparatus, of which the following is a specification, reference being had therein to the accompanying drawings.

This invention relates to a heating apparatus in which products of combustion under forced draft are utilized as the heat-conveying or circulating medium or for heating the heat-conveying or circulating fluid and in which a hot-air engine operated by the products of combustion is employed for maintaining the forced draft of the products of combustion or the circulating medium or both.

It has long been recognized that present methods of heating utilize to a very low degree of efficiency the heat units present in products of combustion, and that the greater portion of these units pass up the chimney and are wasted. This is especially true of heating systems adapted for house installation. Various systems of heating have been devised, however, having a larger percentage of efficiency but these systems have never been adapted for use on a small scale, that is, for use in house installation, because of high first cost and high operating cost, as well as the skilled attention required in operating them. So far as I am informed, no system has heretofore been devised which utilizes to a very high degree of efficiency the heat units present in the products of combustion and which is at the same time adapted for use on any scale. The most efficient devices in use are based on the mechanical fan system which is admitted to be the ideal system because of its combined heating and ventilating facilities but such a system requires electrical or steam power and skilled attendance and therefore has been beyond the reach of the ordinary householder.

The principal object of the invention is to utilize to the greatest degree of efficiency the heat units present in products of combustion and to accomplish this end irrespective of the size and operative scope of the heating apparatus.

A further important object is to utilize the heat units present in products of combustion both for heating purposes and for operating the mechanism necessary to maintain the circulation of the heat-conveying medium and to accomplish this purpose without affecting, to any appreciable degree, the efficiency of the products of combustion as a heating medium.

Another important object of the invention is to provide a heating system which is simple and compact in construction and of low initial cost, which is simple and to a large extent automatic in operation and does not require skilled attendance and which can be operated economically and at low cost and therefore which is especially adapted for house installation.

A further object is to provide for so controlling the rate of combustion that any desired temperature may be automatically maintained in the rooms or spaces to be heated.

Another object of the invention is to provide for so controlling the products of combustion that at any predetermined speed of the hot-air engine, the flow of the products of combustion is directed either into the exhaust or through the heating system and utilized for heating purposes.

Other objects of the invention will be more specifically described and set forth hereinafter.

The various features of the invention may be embodied in systems in which the products of combustion are distributed throughout the system and employed as the heat-conveying or circulating medium; or in systems in which the products of combustion are employed for the purpose of raising the temperature of the heat-conveying or circulating medium; that is, in what are termed in the art as direct and indirect systems respectively.

A brief statement of the best mode of applying my invention is as follows: A suitable combustion chamber is provided for generating products of combustion which are then led through suitable flues or conduits into a stack heater in case the invention is applied to the indirect system of heating or into a system of heaters or radiators where it is embodied in a direct system. The supply of air to maintain combustion is drawn from the atmosphere through a supply conduit within which is arranged a fan or blower to insure a forced circulation throughout the system whether it be direct or indirect. To operate the fan or blower, a hot-air engine is arranged with its hot-air cylinder within and its cooling cylinder without the combustion chamber in order to utilize the heat present in the products of combustion as the motive power. The supply conduit not only furnishes the necessary air to maintain combustion but also is connected to a jacket surrounding the cooling cylinder of the hot-air engine and thereby supplies a constant current of cool atmospheric air under a forced blast to reduce the temperature of the cooling cylinder and thereby greatly increases and maintains the efficiency of the engine. The air in passing through the jacket surrounding the cooling cylinder is raised in temperature and is then directed through a suitable conduit and used, in the direct system of heating, to reduce the temperature of the products of combustion to a practical working basis or, in the indirect system, as the circulating or heat conveying fluid. When used in the latter system the air is passed around the exterior of a stack and raised to the desired temperature before being distributed to the rooms or spaces to be heated. The flow of air into the combustion chamber is automatically controlled by the temperature of the rooms o  spaces to be heated; being increased when the temperature falls below a predetermined point and decreased when it rises above that point. Means are also provided whereby the products of combustion are automatically shut off from the exhaust and directed through the heating system when the engine attains a predetermined speed.

Figure 2:
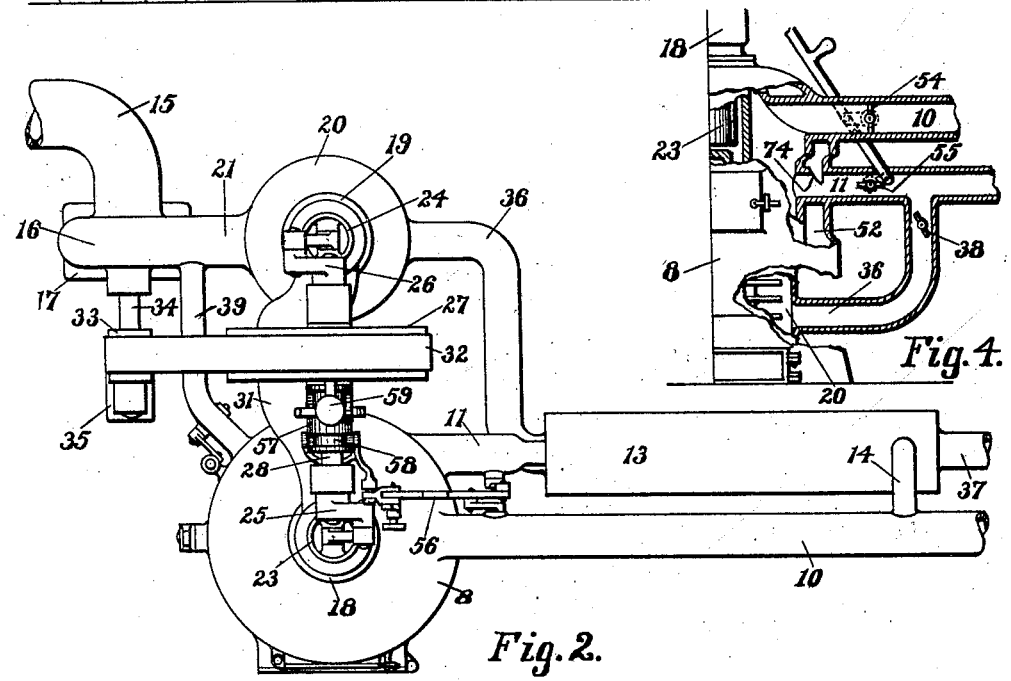
Figure 4:
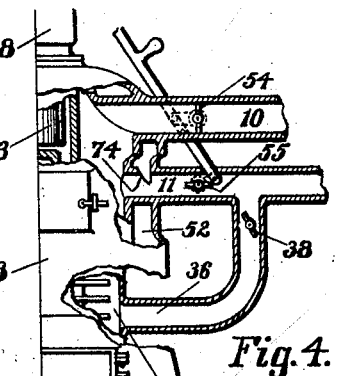
Figure 3:
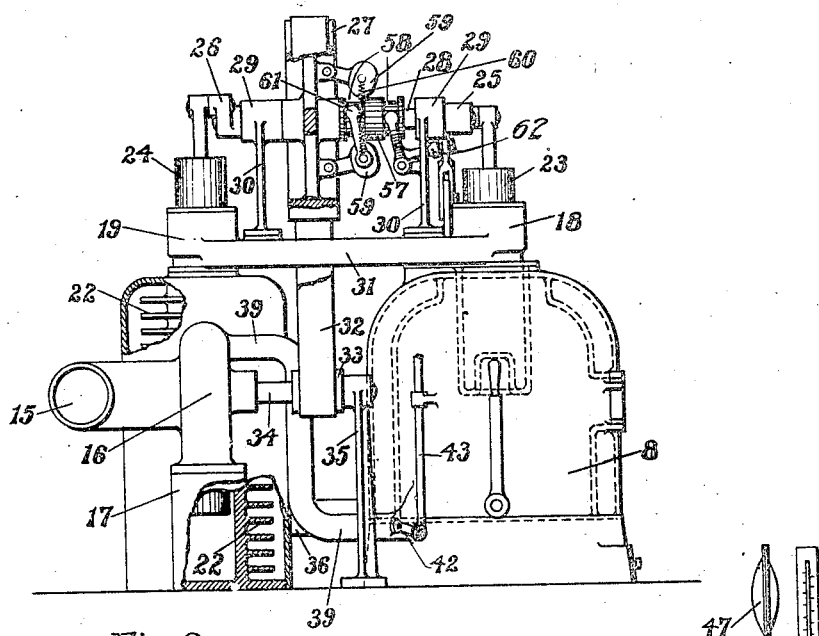
Figures 5, 6, 7:
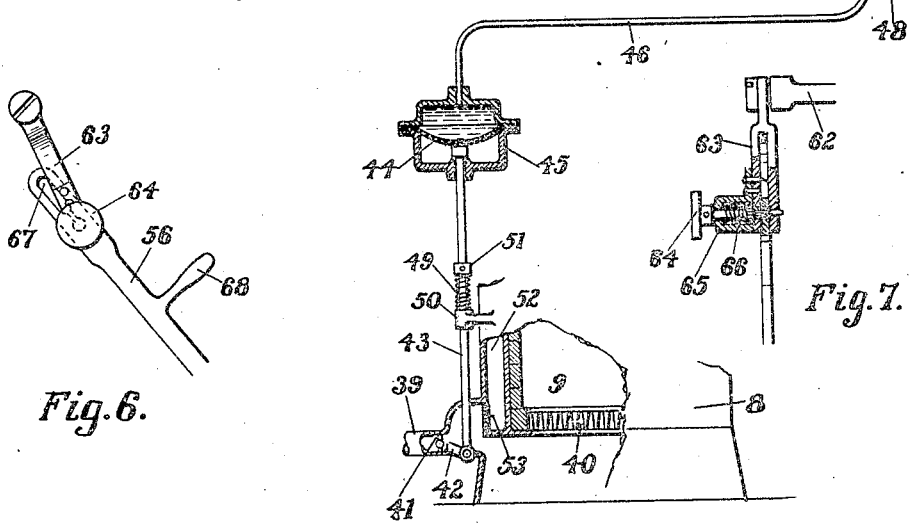

In the drawings illustrating one embodiment of the invention, Figure 1 is a side elevation, partly in section, of a heating apparatus constructed and controlled in accordance with my invention; Fig. 2 is a plan view of the same; Fig. 3 is an end elevation, partly in section, looking from left to right; Fig. 4 is a sectional view, partly in elevation, of the arrangement of the flues when the invention is applied to a direct system of heating; Fig. 5 is a diagrammatic view of the mechanism for controlling the supply of air to the combustion chamber; Figs. 6 and 7 are detailed views of a portion of the mechanism controlling the flow of the products of combustion from the combustion chamber.

In the illustrated embodiment of the invention is shown a suitable heater 8, having a combustion chamber 9, provided with an exhaust flue 10 and an outlet flue 11. The exhaust flue may be suitably connected to permit the products of combustion to be exhausted into the chimney or atmosphere as desired. The outlet flue 11 may be connected to a stack heater when the indirect system is used or to a system of radiators or heaters (not shown) when the direct system is employed. In Fig. 1 of the drawings the combustion chamber is shown connected to a stack 12 within a casing 13 the outlet end 14 of the stack being connected to the exhaust flue 10. In Fig. 4, showing the arrangement in a direct system, the outlet flue 11 is designed to be connected by suitable conduits to radiators or heaters in the rooms or spaces to be heated.

The supply of air required by the system is preferably drawn from the atmosphere through a supply conduit 15 by a fan or blower (not shown) within a casing 16 supported on a base 17, which fan or blower maintains the circulation throughout the system whether it be direct or indirect.

For the purpose of operating the fan or blower in an economical manner, I provide a hot-air engine working on some embodiment of the so-called Carnot cycle, preferably of the Stirling or Rider-Ericsson type, and so arranged with respect to the combustion chamber that it is operated by the heat generated and present in the products of combustion without affecting their efficiency as a heating medium. To this end, as illustrated, a hot-air engine is provided, having a hot-air cylinder 18 set in the heater with the lower portion of the cylinder within the combustion chamber and subjected to the heat generated in the products of combustion. A cooling cylinder 19 is supported outside of the heater and surrounded by a jacket 20 adapted, in the construction shown in the drawings to be cooled by air at the atmospheric temperature forced through a pipe 21 from the supply pipe 15 by the fan or blower. The cooling cylinder is provided with fins 22 to accelerate the cooling process. Within the cylinders 18 and 19 are arranged pistons 23 and 24 operating cranks 25 and 26 respectively and thereby a fly-wheel 27 on a shaft 28 mounted in suitable bearings 29 supported by brackets 30 on a cross-piece 31 connecting the two cylinders. The fly-wheel is connected by a belt 32 to a pulley 33 on the shaft 34 of the fan or blower, the outer end of the shaft being supported by a bracket 35, and thereby the fan or blower is operated by the hot-air engine.

In order to utilize the heat given up by the cooling cylinder of the hot-air engine, the air which passes into and through the jacket surrounding the cooling cylinder is directed through a conduit 36 and employed in whole or in part as the circulating or heat-conveying medium. Where the indirect system is used, the conduit 36 opens into the stack casing 13 (see Fig. 1) and the air already raised in temperature in the cooling jacket is forced into and passes through the stack casing where its temperature is raised to the desired extent. After passing out of the stack casing through the outlet 37 the heated air is then distributed through suitable conduits to the rooms or spaces to be heated. In the direct system, the conduit 36 communicates with the outlet flue 11 (see Fig. 4) and the air is mixed with the products of combustion and utilized for reducing the temperature of the same to a practical working basis and increasing the volume of the circulating or heat-conveying fluid. The conduit 36 in such connection may be provided with a damper 38 to regulate the mixture of air and products of combustion and thereby the temperature of the heat-conveying medium.

The supply of air to the combustion chamber to maintain combustion, flows through a pipe 39 from the fan casing and enters the base of the heater passing up through the grate 40, the volume of the air being controlled by a damper 41. This damper may be operated by hand if desired but I prefer to provide means for operating it automatically according to the requirements of the system. In the drawings the well known Powers regulator is shown to accomplish this result but any other automatic control may be employed in this connection. In the illustrated device, the damper 41 is provided with an arm 42 pivotally connected to one end of a rod 43 the other end of which is in contact with a diaphragm 44 mounted within a casing 45. The casing is connected by a pipe 46 with a thermostat 47 and thermometer 48, the pipe, casing and thermostat being filled with a liquid having a low boiling point. Normally the damper is fully opened but when the temperature of the space to be heated rises to a predetermined point the liquid in the thermostat begins to boil and thereby generates additional pressure in the casing 45 which moves the rod 43 through the medium of the diaphragm to partially close the damper 41 checking the rate of combustion within the combustion chamber. As soon as the temperature falls below the predetermined point the pressure on the diaphragm is diminished and the rod 43 is returned to normal position and the damper opened. To insure the return of the rod a spring 49 is mounted on the rod and held between a bracket 50 and an adjustable collar 51 on the rod. When the rod is operated to close the damper, the spring is compressed, and upon the return of the diaphragm to normal position, the spring 49 forces the rod against the diaphragm and opens the damper.

To increase the efficiency of my apparatus and to utilize the heat units which radiate through the heater it is provided with a radiation chamber 52 having a grille 53 (see Fig. 5) which admits air from the pipe 39. The air so admitted flows through the radiation chamber and into the outlet flue 11 through an opening 74 and mixes with the products of combustion, thereby toning down the temperature of the products of combustion but increasing their volume and utilizing the heat units ordinarily wasted through radiation. If at any time it is undesirable to add this volume of air to the products of combustion, the grille 53 may be closed and the air in the radiation chamber becomes stagnant and acts as an insulator to prevent radiation from the combustion chamber.

For the successful operation of the apparatus it is preferable that the exhaust flue 10 and the outlet flue 11 should be so controlled that when one is open the other is closed and any suitable means may be employed to accomplish this result. One such means is shown in the drawings and comprises two dampers 54 and 55 arranged within the exhaust flue and the outlet flue respectively and connected by a rod 56, one being open and the other closed. Normally the exhaust is open and outlet closed. This rod may be manipulated by hand or automatically as desired. In the present case, I have provided mechanism whereby it may be operated to close the exhaust flue and open the outlet flue when the hot-air engine attains a certain predetermined speed and to return the dampers to normal position whenever the engine falls below that speed. This mechanism is as follows. A collar 57 is loosely mounted on the shaft 28 and provided with two annular cam paths 58. Upon the fly-wheel 27 are pivotally mounted two weights 59 which are capable of radial movement only in relation to the fly-wheel and are connected together by springs 60. When the fly-wheel revolves the weights are thrown outwardly against the tension of the springs. One of the weights carries a fixed arm 61 the end of which engages one of the cam-paths on the collar 57 and when that weight is thrown out radially by the revolution of the fly-wheel, the arm 61 moves the collar 57 longitudinally on the shaft. On the adjacent support 30 is pivotally mounted a bell-crank lever 62 one end of which is pivotally connected to the rod 56 by a link 63 (see Figs. 6 and 7) and the other end engages the other cam-path 58 on the collar 57, whereby the longitudinal movement of the collar moves the rod 56 to operate the dampers 54 and 55 to close the exhaust flue and to open the outlet flue. The tension of the springs 60 determines the speed of the hot-air engine which is required to operate the dampers and the bearing 29 limits the longitudinal movement of the collar 57 to prevent the dampers being turned too far when the engine is running at high speed.

The rod 56 is so connected to the link 63 that it may be disengaged therefrom by withdrawing a pin 64 mounted within a stud 65 on the link, the pin being held in operative position by a spring 66.

The end of the rod 56 is provided with a longitudinal slot 67 and the rod may be so connected to the link 63 that the pin 64 engages the slot 67 which permits the link to be moved without operating the rod. The latter is further provided with a handle 68 to permit it to be moved by hand to set the dampers in any desired position.

The operation of the apparatus is as follows: A fire is started in the combustion chamber for the purpose of generating the products of combustion. After the fire has been properly ignited the heat generated starts the hot-air engine, thereby operating the fan or blower to start and maintain the circulation throughout the system. In the beginning the products of combustion are directed through the exhaust flue, but when the speed of the engine attains a certain predetermined point, the dampers in the exhaust flue and outlet flue are automatically operated by the weights on the fly-wheel to direct the products of combustion through the outlet flue into a stack heater if the indirect system is used, or into the heating system if a direct system is employed. By adjusting the various parts of the apparatus, it may be made to fulfil all the requirements of the particular system in which it is used and after being so adjusted it may be run indefinitely by merely supplying the heater with fuel necessary to maintain combustion.

An important feature of my invention resides in the means employed for cooling the air in the hot air engine. The efficiency of the hot-air engine depends largely upon the difference of the temperature between the hot-air cylinder and the cooling cylinder, or between the hot air end of the cylinder and the cooling end of the cylinder where one cylinder only is provided and in the present case, by using a forced blast of air of atmospheric temperature, I am enabled to keep the cooling portion of the hot air engine at a very low temperature and thereby greatly increase its efficiency. At the same time, by utilizing the air employed for this purpose as the circulating medium in the heating system, I save all the heat given out by the cooling end of the hot air engine and use it to raise the temperature of the circulating medium. As a result no heat energy is wasted beyond the amount which is transformed into kinetic energy in the operation of the hot air engine.

Although I have shown and described an embodiment of my invention including a hot-air engine provided with two cylinders, I do not wish to be limited to that particular construction, as any form of hot-air engine may be used with slight changes of construction. In some cases it may be desirable to use a hot-air engine employing but one cylinder having a heating end and a cooling end. The type of hot-air engine used or employed in the heating apparatus may be selected to suit the particular requirements of each particular apparatus.

It is to be observed that in the embodiment of the invention illustrated, the means for forcing the circulation throughout the system are operated in the main supply pipe through which the supply of air necessary to the operation of the apparatus is drawn from the atmosphere. The forcing means may be arranged at other points in the system and the circulation of the air may be induced, rather than forced, but it is preferable to employ the arrangement shown in the drawings for the reason that the volume of air handled by the fan is of a low temperature, that is, the temperature of the outside air and this fact contributes to the wearing qualities and life of the fan. A fan used for handling heated bodies of air is very liable to become overheated and develop friction and wear out the moving parts rapidly.

It is further to be observed that my heating apparatus is simple and compact and, therefore, is especially adapted for house installation. It is simple in operation and can be operated at a low cost because its efficiency due to the utilization of a very large proportion of the heat generated by combustion, reduces materially the amount of fuel necessary to produce desired results.

It is further well adapted for house installation because of its safety. There is no possibility of high pressure being generated and no danger of overheating of the flues, irrespective of the manner in which the apparatus is handled.

The ventilating feature of this system is of great importance as it positively supplies a constant amount of fresh heated air.

In this application the invention is claimed broadly, the specific construction being described and claimed in another application filed by me March 6th, 1911, Serial No. 612,518, to which reference may be made.

My invention may be embodied in various other constructions and it is not my intention to limit my invention to the exact construction shown in the drawings and hereinbefore described.

What I claim is:—

1. A heating system in which air is utilized as the heat-conveying or circulating medium comprising means for heating said medium, a hot-air engine operated by said heating means, means operated by said hot-air engine for forcing the circulation of said air throughout said system, and means for utilizing said air for cooling the cooling end of said hot-air engine before said air is heated by said heating means for use as the circulating or heat-conveying medium.

2. A heating system in which air is utilized as the heat-conveying or circulating medium comprising a combustion chamber for heating said medium, a hot-air engine operated by the heat generated in said combustion chamber, means operated by said hot-air engine for forcing the circulation of said air throughout said system, and means for utilizing said air for cooling the cooling end of said hot-air engine before said air is heated by said heating means for use as the circulating or heat-conveying medium.

3. A heating system in which air is utilized as the heat-conveying or circulating medium comprising means for heating said medium, a hot-air engine operated by said heating means, a fan operated by said hot-air engine for forcing the circulation of said air throughout said system, and means for utilizing said air for cooling the cooling end of said hot-air engine before said air is heated by said heating means for use as the circulating or heat-conveying fluid.

4. A heating system in which air is utilized as the heat-conveying or circulating medium comprising means for heating said medium, a hot-air engine operated by said heating means, means operated by said hot-air engine for forcing the circulation of said air throughout said system, and means for utilizing said air at atmospheric temperature for cooling the cooling end of said hot-air engine before said air is heated by said heating means for use as the circulating or heat-conveying medium.

5. A heating system in which air is utilized as the heat-conveying or circulating medium comprising a combustion chamber for heating said medium, a hot-air engine operated by the heat generated in said combustion chamber, a fan operated by said hot-air engine for forcing the circulation of said air throughout said system, and means for utilizing said air for cooling the cooling end of said hot-air engine before said air is heated by said combustion chamber for use as the circulating or heat-conveying fluid.

6. A heating system comprising heat-distributing means in combination with a combustion chamber having two outlets, one connected to said heat-distributing means and the other adapted to be connected to an exhaust flue, means for controlling said outlets, means for forcing the circulation of the products of combustion from said combustion chamber and a hot-air engine operated by the heat generated in said combustion chamber for operating said controlling means and said forcing means.

7. A heating system comprising heat-distributing means in combination with a combustion chamber having two outlets, one connected to said heat-distributing means and the other adapted to be connected to an exhaust flue, means for controlling said outlets, means for forcing the circulation of the products of combustion from said combustion chamber and a hot-air engine operated by said heat generated in said combustion chamber for operating said controlling means when said hot-air engine attains a predetermined speed and for operating said forcing means.

In testimony whereof, I hereunto set my hand, in the presence of two subscribing witnesses, this the fifth day of April, 1911.

NATHANIEL B. WALES.

Witnesses:
K. C. UNIAC,
E. F. UNIAC.